Figure 1:
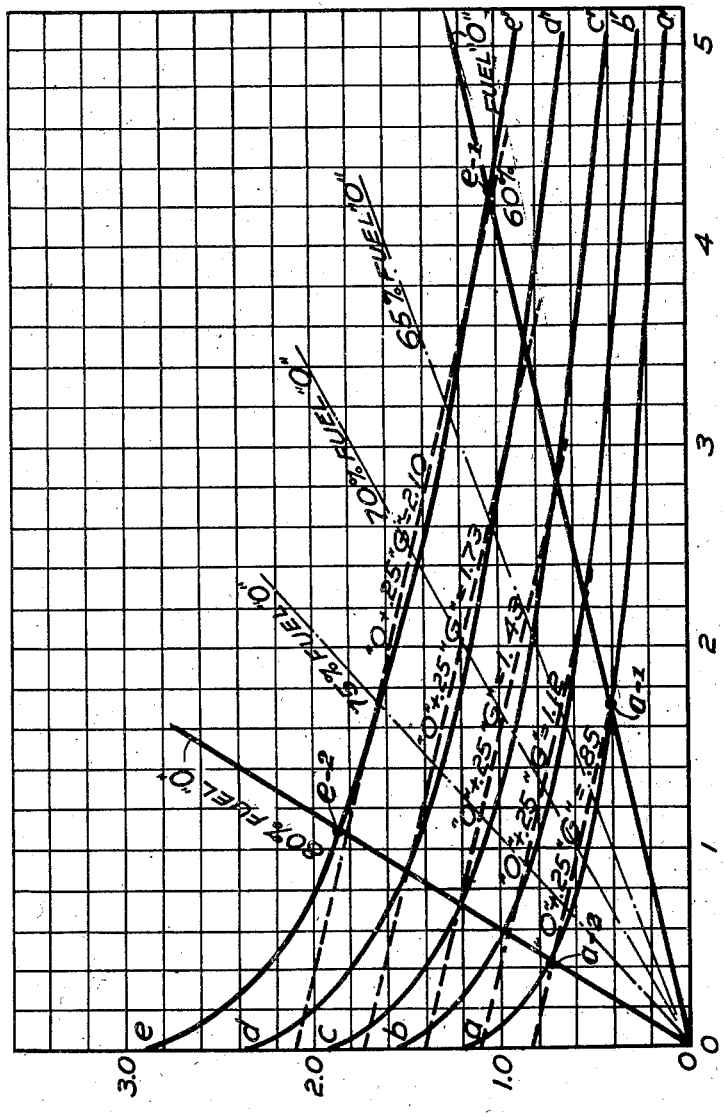

April 1, 1947. S. CHASE 2,418,163
COMBUSTION CONTROL
Filed Jan. 24, 1945 2 Sheets-Sheet 1

INVENTOR
SHERMAN CHASE,
by John E Jackson
his Attorney.

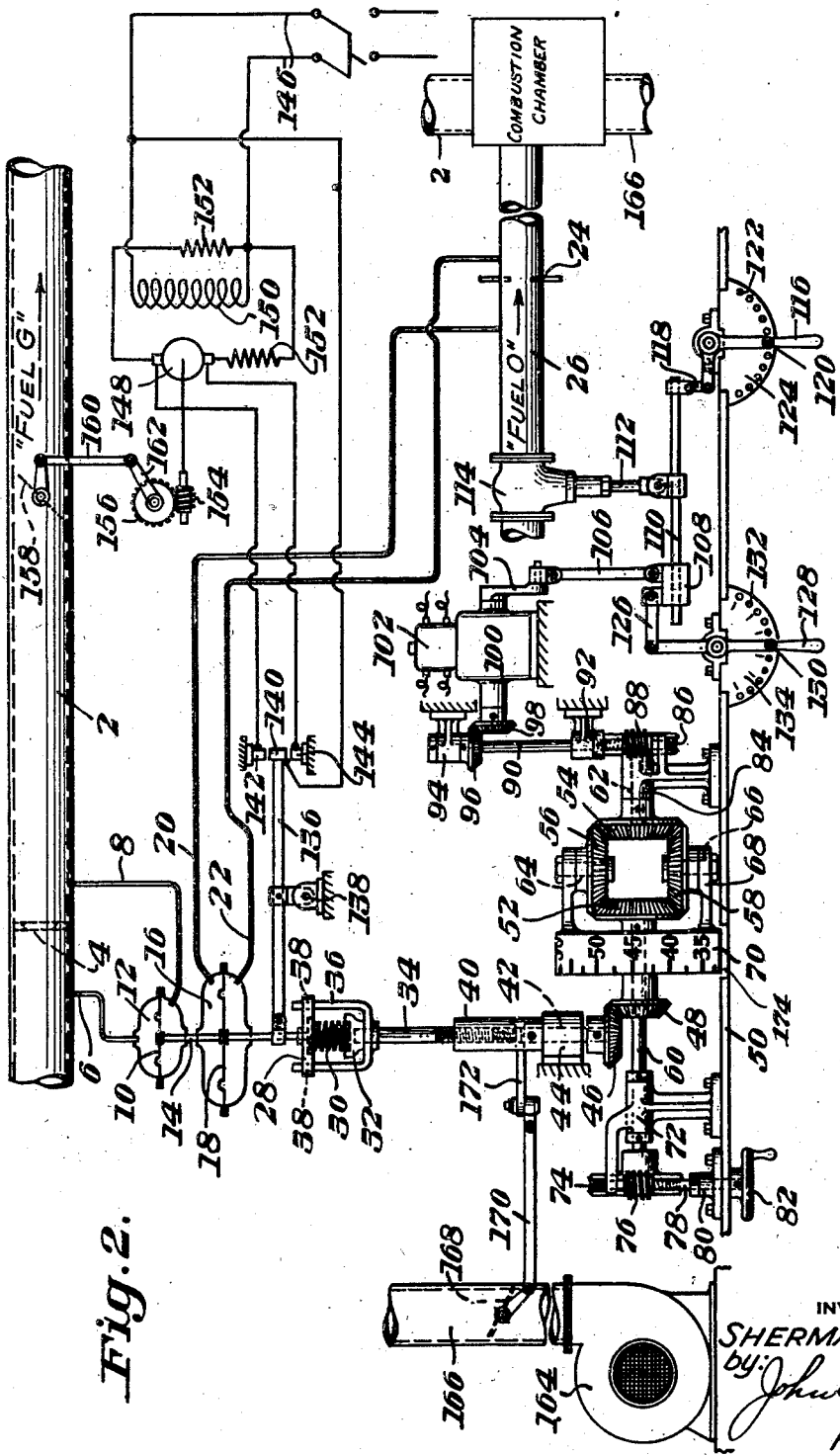

Patented Apr. 1, 1947

2,418,163

UNITED STATES PATENT OFFICE 2,418,163

COMBUSTION CONTROL

Sherman Chase, Evergreen Park, Ill., assignor to Carnegie-Illinois Steel Corporation, a corporation of New Jersey Application January 24, 1945, Serial No. 574,423

10 Claims. (Cl. 158—119)

This invention relates to a combustion control and more particularly to a control for maintaining constant heat input while utilizing two fluid fuels and superimposing on the constant heat input control, a temperature control for furnace regulation. In furnaces such as open hearth furnaces, it is often desirable to use two types of fluid fuels; for example, oil and by-product gas. In such cases it is desirable to use as much by-product gas as is available, but there is not always sufficient gas to maintain the desired B. t. u. input into the furnace, and therefore, it is necessary to vary the ratio between the fuels while maintaining a constant heat input into the furnace. In the usual apparatus for maintaining the total heat input constant while varying the ratio of the fuels, emphasis is placed upon the fact that orifice differentials imposed upon regulating diaphragms are a second power function of the flow and, before they are added together, the first power function must be obtained by means of square root extracting devices, cams, summarizers, or other devices well known to those familiar with the art of fuel controls. The result is usually a complicated control system mathematically correct from zero to infinity, it being possible to obtain the first point by a simple shut-off valve while the upper range has no practical value since the operating range of ratios is usually limited. Thus the complications arising in obtaining these two points is not justified.

During the operation of the furnace, operating conditions may require that input to the furnace be varied. For example, it may be desired to operate the furnace with a maximum roof temperature in which case the roof temperature control may be superimposed upon the constant heat input control. If such superimposed control is used, it is also desirable to change the flow of air to the furnace in accordance with the change in total B. t. u. input.

It is an object of my invention to provide a method of maintaining a constant heat input to a furnace while using two fluid fuels and eliminating the cam, square root extractors, summarizers, and the like.

Another object is to provide apparatus which may be used for carrying out the method.

A further object is to provide means for superimposing a temperature control on the constant heat input control.

A still further object is to control the flow of air to a furnace in accordance with the total B. t. u. input to the furnace.

These and other objects will be more apparent after referring to the following specification and attached drawings, in which:

Figure 1 is a curve sheet showing the relation between orifice differential of the two fuels for various fuel ratios and for various fuel inputs; and Figure 2 is a schematic showing of apparatus used in carrying out my invention.

I have found that by plotting the curve representing with mathematical accuracy the function a constant heat input control is to perform and drawing an average straight line through the curve between the desired operating range that the straight line will not depart more than plus or minus 2% from the theoretical requirements. For example, it may be desired to maintain a constant B. t. u. input into a combustion chamber while using fluid fuels O and G which flow to the combustion chamber through pipes having measuring orifices therein. Fuel O is to deliver between 60% and 80% of the total B. t. u. requirements and with manual control of fuel O it is desired to automatically add sufficient quantity of fuel G to maintain a constant total heat input to the combustion chamber. The total heat input is known to vary between 35,000,000 B. t. u. per hour and 55,000,000 per hour under various operating conditions. The amount of fuel O flowing through its measuring orifice is proportional to the square root of the pressure drop across the orifice in inches of water or is equal in B. t. u. per hour to 32,400,000 times the square root of the inches of water. In like manner, the flow of fuel G in B. t. u. per hour is equal to 10,630,000 times the square root of the inches of water. On this basis, constant B. t. u. per hour curves $a$—$a'$, $b$—$b'$, $c$—$c'$, $d$—$d'$, and $e$—$e'$, are constructed, the curves representing 35,000,000, 40,000,000, 45,000,000, 50,000,000 and 55,000,000 B. t. u. per hour respectively. It is thought that the construction of the curves is obvious, but by way of example, two points on each of curves $a$—$a'$ and $e$—$e'$ will be calculated. For a 35,000,000 B. t. u. per hour requirement with fuel O furnishing 60% or 21,000,000 B. t. u. per hour, fuel G will furnish 14,000,000 B. t. u. per hour. Therefore, the square root of the inches of water differential for fuel O equals 21,000,000 divided by 32,400,000 and the inches of water differential equals 0.42. The square root of the inches of water differential for fuel G is equal to 14,000,000 divided by 10,630,000 and the inches of water differential equals 1.73. This gives point $a$—1 on curve $a—a'$. When 80% of the fuel requirements or 28,000,000 B. t. u. is furnished by fuel O and 7,000,000 B. t. u. is furnished by fuel G, the square root of inches of water differential of fuel O will be 28,000,000 divided by 32,400,000 and the inches of water differential will be 0.745. In like manner, the square root of the inches of water differential of fuel G will be 7,000,000 divided by 10,630,000 and the inches of water differential of fuel G will equal 0.43. This gives point $a—2$ on curve $a—a'$.

For a 55,000,000 B. t. u. per hour requirement with fuel O furnishing 60% or 33,000,000 B. t. u. the square root of the inches of water differential of fuel O will be 33,000,000 divided by 32,400,000 and the inches of water differential of fuel O will be 1.035. The remaining fuel or 22,000,000 B. t. u. will be furnished by fuel G and the square root of the inches of water differential will be equal to 22,000,000 divided by 10,630,000 or the inches of water differential of fuel G will be 4.28. This gives point $e—1$ on curve $e—e'$.

When using 80% of fuel O the square root of the inches of water differential of fuel O will be 44,000,000 divided by 32,400,000 or the inches of water differential will be 1.84 and the square root of the inches of water differential of fuel G will be 11,000,000 divided by 10,630,000 or the inches of water differential of fuel G will be 1.07. This gives point $e—2$ on curve $e—e'$.

In like manner, various other points for different fuel ratios for the various fuel requirements are calculated and curves $a—a'$, $b—b'$, $c—c'$, $d—d'$ and $e—e'$, drawn. A straight line indicating the average pressure drop across the orifices when using between 60% and 80% of fuel O is then drawn for each curve and the straight line formula determined. The straight line equations for fuel requirements of 35,000,000, 40,000,000, 45,000,000, 50,000,000 and 55,000,000 B. t. u. per hour are found to be $O+.25G$ equals .85, 1.12, 1.43, 1.73 and 2.10 respectively, as shown in Figure 1. It will be seen that the straight lines are parallel and therefore the slopes of the curves are equal and the left hand side of each of the equations is constant while the right side varies. It will be understood that the above calculations and curves are merely illustrative and that similar curves may be calculated in the same manner for other types of fuels and, if desired, intermediate curves between curves $a—a'$, $b—b'$, $c—c'$, $d—d'$ and $e—e'$ may be constructed. After calculating the equations for the various B. t. u. requirements, the orifice differentials are then added by means of diaphragms in accordance with the left side of the formula and the force thus exerted is opposed by means of a variable spring which meets the conditions under the right hand side of the equation. By varying the force of the spring against the diaphragms between 0.85 and 2.10 inches of water column the force of the spring indicates a constant B. t. u. input range of 35,000,000 to 55,000,000 B. t. u. per hour if the G diaphragm area is 25% of the O diaphragm area or if the ratio between forces is provided by varying fulcrum points of a weigh beam to which the diaphragm forces are suitably imparted. In other words, the slope of the curve, which is 0.25 as illustrated, determines the ratio at which the pressures of the two fuels are added and this total pressure is balanced against the right side of the formula by any suitable means. From the above it will be seen that the general equation representing the flow of the fuels will be $O+sG=C$ where O is the pressure drop of one fuel across a measuring orifice, G is the pressure drop of the other fuel across a measuring orifice, $s$ is the slope of the curve and C is a constant for any constant heat flow.

Referring to Figure 2 of the drawings, the reference numeral 2 indicates a pipe in which fuel G is flowing in the direction of the arrow. Within the pipe 2 is a measuring orifice 4 having impulse lines 6 and 8 leading to opposite sides of a diaphragm 10 in diaphragm chamber 12. The diaphragm 10 is attached to a rod 14 which extends from the diaphragm chamber 12 through a diaphragm chamber 16 having a diaphragm 18 also attached to rod 14. The area of diaphragm 10 is one-fourth that of the area of diaphragm 18 when using the fuels described above. Impulse lines 20 and 22 lead to opposite sides of diaphragm 18 from opposite sides of a measuring orifice 24 in a pipe 26 through which fuel O flows in the direction of the arrow. Attached to the free end of rod 14 is a plate 28 which is suitably recessed to retain one end of a spring 30, the other end of the spring 30 being retained in a suitably recessed cup 32 attached to a rod 34 which is screw threaded at its lower end. Attached to rod 34 is a yoke 36 arranged to slide through holes 38 in plate 28 to prevent the rod 34 from rotating. The threaded end of rod 34 is threaded into a sleeve 40, to the lower end of which is attached for rotation therewith a shaft 42. This shaft is supported in and extends through bearing 44 and has a bevel gear 46 attached to its lower end which meshes with a bevel gear 48. A differential gearing similar to that of an automobile is attached to the back of a panel board 50. Gears 52, 54, 56 and 58 are the differential gears, gear 52 being attached to propeller shaft 60 and gear 54 being attached to shaft 62. Gears 56 and 58 are mounted on shafts 64 and 66 respectively, and these shafts are supported by yoke 68. Dial 70 forms part of the yoke 68 and is attached to gear 48 for rotation therewith. Shaft 60 is mounted for rotation in bearing 72 and rotary motion is imparted thereto by means of worm gear 74 and worm 76 mounted on shaft 78 which passes through and is supported in a bearing 80 attached to the panel board 50. The end of shaft 78 extends through the panel board and has a hand wheel 82 fastened thereto. Shaft 62 is supported for rotation in bearing 84 and rotary motion is imparted thereto by means of a worm gear 86 and worm 88 mounted on shaft 90, which is supported in bearings 92 and 94. A bevel gear 96 is mounted on shaft 90 and meshes with a bevel pinion 98 of reversible reduction gearing 100, which is driven by motor 102. Extending from the end of the reduction gearing 100 opposite pinion 98 is a shaft having mounted thereon a bell crank 104 which imparts reciprocating motion to a rod 106 having a slide 108 at its lower end. The slide 108 receives one end of a rod 110 to which is attached the stem 112 of a valve 114 which controls the flow of fuel O. The other end of rod 110 is suitably attached to a hand lever 116 by means of linkage 118. Hand lever 116 has a hole 120 therein for receiving a pin to lock it in place in one of the holes 122 on a plate 124 attached to the panel board 50. Slide 108 may be moved along rod 110 by means of link 126 attached to a hand lever 128 which has an opening 130 therein for receiving a pin to lock it in place in one of the holes 132 in a plate 134 attached to panel board 50.

Attached to rod 14 is a lever 136 which is pivoted at 138 and carries a contactor 140 on its free end. The contactor is arranged to make contact with contacts 142 or 144 to complete a circuit from power supply lines 146 to motor armature 148 to start, stop, or reverse the rotation of the motor which is provided with a field 150 and stabilizing resistors 152. Armature 148 is suitably connected to gears 154 and 156, the latter of which operates a butterfly valve 158 in pipe 2 through link 160 and bell crank lever 162.

Air for the combustion of fuels O and G is supplied by a blower 164 through an outlet pipe 166 having a butterfly valve 168 therein for controlling the flow of air. Butterfly valve 168 is connected by means of suitable linkage 170 to a lever 172 which is mounted for rotation with sleeve 40.

The operation of the device is as follows:

By turning the hand wheel 82 motion is transmitted to shaft 42 through the differential gearing, this causing sleeve 40 to rotate with respect to shaft 34 to change the compression of spring 30. Dial 70 is calibrated in accordance with the spring compression as brought forth in the curve sheets shown in Figure 1 to indicate the total B. t. u. input into the furnace. The motion of sleeve 40 is also proportional to the total B. t. u. input and this movement is utilized to change the setting of valve 168 in accordance with the total B. t. u. requirements. When it is desired to maintain a constant B. t. u. input while changing the proportion of fuels G and O, the B. t. u. requirement is set by moving hand wheel 82 until the operator sees the required B. t. u. input on the dial 70 through a slot 174 in the panel board 50. If it is desired to decrease the flow of fuel O, valve 114 is closed by moving lever 116 to the left. This decreases the differential pressure on diaphragm 18 and the spring 30 causes shaft 14 to move upwardly to close contacts 140 and 144, thus completing the circuit to motor armature 148 to open valve 158 and increasing the flow of fuel G. This increases the differential pressure on diaphragm 10 until the summation pressure of diaphragms 10 and 18 again equals the pressure of spring 30. Balancing of the pressures moves the lever 136 to neutral position to stop the rotation of armature 148. In like manner, when it is desired to increase the flow of fuel O valve 114 is opened by moving lever 116 to the right, this increasing the differential pressure on diaphragm 18 and closing contacts 140 and 142 to reverse the rotation of armature 148 and close valve 158. Closing of valve 158 decreases the flow of fuel G and also the differential pressure on diaphragm 10 until the summation pressures of diaphragms 10 and 18 are once more equal to the pressure of spring 30. This opens contacts 140 and 142, stopping rotation of the motor armature 148. The decrease or increase of the flow of fuel O has no effect on the pressure of spring 30 or on the position of sleeve 40 and therefore there is no change in the flow of air to the furnace.

The position of the apparatus shown in Figure 2 is that of minimum fuel input and when it is desired to increase the total B. t. u. input manually, hand wheel 82 is turned to increase the pressure on spring 30, this also changing the position of sleeve 40 to open valve 168 in proportion to the total B. t. u. input to the furnace. Due to the increase of pressure on spring 30, the pressure on diaphragms 10 and 18 moves shaft 14 upwardly to close contacts 140 and 144 which operates motor armature 148 to open valve 158. This increases the differential pressure on diaphragm 10 until the summation pressure is equal to the pressure of spring 30, at which time the contacts 140 and 144 are opened by movement of lever 136 to stop the rotation of armature 148. When it is desired to decrease the total B. t. u. input manually, the hand wheel 82 is moved to decrease the pressure on spring 30 and the operation of the control is the reverse of that described above. There is no change in the flow of fuel O so that if the B. t. u. value of fuel O is greater than the total empirical B. t. u. requirement, the valve 158 remains entirely closed and the supply of fuel O must be decreased manually until the heat supplied thereby is below the total empirical B. t. u. requirement. However, in normal operation of the furnace the decrease will seldom be sufficient to cause this condition to exist.

The motor 102 may be connected to a roof temperature or furnace temperature control arranged to start, stop, or reverse motor 102 in the usual manner in accordance with temperature balance or unbalance. When the roof temperature becomes too high, the motor 102 operates through reduction gearing 100, the differential gearing and associated mechanism to rotate sleeve 40 to decrease the pressure on spring 30. Rotation of sleeve 40 causes valve 168 to close to decrease the flow of air to the furnace in accordance with the decrease in the total B. t. u. input which is indicated on scale 70. In addition to changing pressure on spring 30, rotation of motor 102 causes the bell crank lever 104 to raise link 106 to close valve 114 an amount sufficient to maintain the existing ratio of fuel O to fuel G. The effect of the movement of link 106 on valve 114 may be varied by moving sleeve 108 along rod 110 by means of lever 128. The decrease in pressure on spring 30 functions to close valve 158 in the same manner as described above for manual control except that the change in flow of fuel G is less because the flow of fuel O has also been decreased. In like manner, when the roof temperature falls below the desired temperature, motor 102 operates to increase the pressure on spring 30 and to increase the flow of fuel O. The increase of the pressure of spring 30 causes valve 158 to open in the manner described above. It will be seen that with automatic control the ratio between fuel O and fuel G remains constant regardless of the total B. t. u. requirement so that fuel O can never supply more than the total B. t. u. requirements as is the case with manual control by hand wheel 82. If desired, the motor 102 could be operated manually to change the total B. t. u. input.

While one embodiment of my invention has been shown and described, it will be apparent that other adaptations and modifications may be made without departing from the scope of the following claims.

I claim:

1. Apparatus for maintaining a constant heat input to a combustion chamber while using two fluid fuels which comprises a conduit for each of the fuels, an orifice in each conduit, a diaphragm connected across each orifice, means for adding the pressures exerted on the diaphragms, means for applying pressure to counteract the resultant diaphragm pressures, means for changing the flow of one of the fuels, and means responsive to the unbalance between the diaphragm pressures and the counteracting pressure due to the change in flow of the first fuel for changing the flow of the second fuel.

2. Apparatus for controlling the flow of two fluid fuels to a combustion chamber which comprises a conduit for each of the fuels, an orifice in each conduit, a diaphragm connected across each orifice, means for adding the pressures exerted on the diaphragms, means for applying pressure to counteract the resultant diaphragm pressures, means for changing the flow of one of the fuels, means responsive to the unbalance between the diaphragm pressures and the counteracting pressure due to the change in flow of the first fuel for changing the flow of the second fuel, and means for varying the pressure of said counteracting means to change the total heat input to the combustion chamber.

3. Apparatus for controlling the flow of two fluid fuels to a combustion chamber which comprises a conduit for each of the fuels, an orifice in each conduit, a diaphragm connected across each orifice, means for adding the pressures exerted on the diaphragms, means for applying pressure to counteract the diaphragm pressures, means for changing the flow of one of the fuels, means responsive to the unbalance between the diaphragm pressures and the counteracting pressure due to the change in flow of the first fuel for changing the flow of the second fuel, means for varying the pressure of said counteracting means to change the total heat input to the combustion chamber, means for supplying air to the combustion chamber, and means responsive to the pressure on said counteracting means to vary the air supply in proportion to the total heat input.

4. Apparatus for controlling the flow of two fluid fuels to a combustion chamber which comprises a conduit for each of the fuels, an orifice in each conduit, a diaphragm connected across each orifice, means for adding the pressures exerted on the diaphragms, means for applying pressure to counteract the diaphragm pressures, means for changing the flow of one of the fuels, means responsive to the unbalance between the diaphragm pressures and the counteracting pressure due to the change in flow of the first fuel for changing the flow of the second fuel, means for varying the pressure of said counteracting means to change the total heat input to the combustion chamber, said last named means also changing the position of the flow changing means of the first fuel to maintain the existing ratio of the two fuels regardless of the change in total heat input.

5. Apparatus for controlling the flow of two fluid fuels to a combustion chamber which comprises a conduit for each of the fuels, an orifice in each conduit, a diaphragm connected across each orifice, means for adding the pressures exerted on the diaphragms, means for applying pressure to counteract the diaphragm pressures, means for changing the flow of one of the fuels, means responsive to the unbalance between the diaphragm pressures and the counteracting pressure due to the change in flow of the first fuel for changing the flow of the second fuel, means for varying the pressure of said counteracting means to change the total heat input to the combustion chamber, said last named means also changing the position of the flow changing means of the first fuel to maintain the existing ratio of the two fuels regardless of the change in total heat input, means for supplying air to the combustion chamber, and means responsive to the pressure on said counteracting means to vary the air supply in proportion to the total heat input.

6. Apparatus for maintaining a constant heat input to a combustion chamber while using two fluid fuels which comprises a conduit for each of the fuels, an orifice in each conduit, a diaphragm connected across each orifice, a rod connecting the diaphragms and extending therefrom, a plate attached to the extended end of the rod, a spring bearing against said plate for applying pressure to counteract the diaphragm pressures, means for changing the flow of one of the fuels, and means responsive to the unbalance between the diaphragm pressures and the counteracting pressure due to the change in flow of the first fuel for changing the flow of the second fuel.

7. Apparatus for controlling the flow of two fluid fuels to a combustion chamber which comprises a conduit for each of the fuels, an orifice in each conduit, a diaphragm connected across each orifice, a rod connecting the diaphragms and extending therefrom, a plate attached to the extended end of the rod, a spring bearing against said plate for applying pressure to counteract the diaphragm pressures, means for changing the flow of one of the fuels, means responsive to the unbalance between the diaphragm pressures and the counteracting pressure due to the change in flow of the first fuel for changing the flow of the second fuel, said plate having a pair of holes therein, a yoke passing through said holes and bearing against the free end of said spring, a rod attached to the end of the yoke opposite the diaphragms, a rotatable sleeve, the free end of said last named rod being threaded into said sleeve, and means for rotating said sleeve to vary the pressure on said spring to change the total heat input to the combustion chamber.

8. Apparatus for controlling the flow of two fluid fuels to a combustion chamber which comprises a conduit for each of the fuels, an orifice in each conduit, a diaphragm connected across each orifice, a rod connecting the diaphragms and extending therefrom, a plate attached to the extended end of the rod, a spring bearing against said plate for applying pressure to counteract the diaphragm pressures, means for changing the flow of one of the fuels, means responsive to the unbalance between the diaphragm pressures and the counteracting pressure due to the change in flow of the first fuel for changing the flow of the second fuel, said plate having a pair of holes therein, a yoke passing through said holes and bearing against the free end of said spring, a rod attached to the end of the yoke opposite the diaphragms, a rotatable sleeve, the free end of said last named rod being threaded into said sleeve, means for rotating said sleeve to vary the pressure on said spring to change the total heat input to the combustion chamber, means for supplying air to the combustion chamber, and means connected to said sleeve for varying the air supply in proportion to the total heat input.

9. Apparatus for controlling the flow of two fluid fuels to a combustion chamber which comprises a conduit for each of the fuels, an orifice in each conduit, a diaphragm connected across each orifice, a rod connecting the diaphragms and extending therefrom, a plate attached to the extended end of the rod, a spring bearing against said plate for applying pressure to counteract the diaphragm pressures, means for changing the flow of one of the fuels, means responsive to the unbalance between the diaphragm pressures and the counteracting pressure due to the change in flow of the first fuel for changing the flow of the second fuel, said plate having a pair of holes therein, a yoke passing through said holes and bearing against the free end of said spring, a rod attached to the end of the yoke opposite the diaphragms, a rotatable sleeve, the free end of said last named rod being threaded into said sleeve, means for rotating said sleeve to vary the pressure on said spring to change the total heat input to the combustion chamber, said last named means also changing the position of the flow changing means of the first fuel to maintain the existing ratio of the two fuels regardless of the change in total heat input.

10. Apparatus for controlling the flow of two fluid fuels to a combustion chamber which comprises a conduit for each of the fuels, an orifice in each conduit, a diaphragm connected across each orifice, a rod connecting the diaphragms and extending therefrom, a plate attached to the extended end of the rod, a spring bearing against said plate for applying pressure to counteract the diaphragm pressures, means for changing the flow of one of the fuels, means responsive to the unbalance between the diaphragm pressures and the counteracting pressure due to the change in flow of the first fuel for changing the flow of the second fuel, said plate having a pair of holes therein, a yoke passing through said holes and bearing against the free end of said spring, a rod attached to the end of the yoke opposite the diaphragms, a rotatable sleeve, the free end of said last named rod being threaded into said sleeve, means for rotating said sleeve to vary the pressure on said spring to change the total heat input to the combustion chamber, said last named means also changing the position of the flow changing means of the first fuel to maintain the existing ratio of the two fuels regardless of the change in total heat input, means for supplying air to the combustion chamber, and means connected to said sleeve for varying the air supply in proportion to the total heat input.

SHERMAN CHASE.

REFERENCES CITED

The following references are of record in the file of this patent:

UNITED STATES PATENTS

| Number | Name | Date |
| --- | --- | --- |
| 1,877,576 | O'Connor | Sept. 13, 1932 |
| 2,212,606 | Klinker | Aug. 27, 1940 |
| 1,290,513 | Collins et al. | Jan. 7, 1919 |
| 2,193,240 | Schmidt | Mar. 12, 1940 |